US012175419B2

(12) United States Patent
Lee et al.

(10) Patent No.: US 12,175,419 B2
(45) Date of Patent: Dec. 24, 2024

(54) COMPUTERIZED SYSTEMS AND METHODS FOR PRODUCT CATEGORIZATION USING ARTIFICIAL INTELLIGENCE

(71) Applicant: Coupang Corp., Seoul (KR)

(72) Inventors: Gil Ho Lee, Shanghai (CN); Pankesh Bamotra, Bellevue, WA (US)

(73) Assignee: Coupang Corp., Seoul (KR)

( * ) Notice: Subject to any disclaimer, the term of this patent is extended or adjusted under 35 U.S.C. 154(b) by 793 days.

(21) Appl. No.: 17/225,056

(22) Filed: Apr. 7, 2021

(65) Prior Publication Data

US 2021/0295185 A1    Sep. 23, 2021

Related U.S. Application Data

(63) Continuation of application No. 16/793,536, filed on Feb. 18, 2020, now Pat. No. 11,023,814.

(51) Int. Cl.
*G06N 20/00* (2019.01)
*G06F 7/08* (2006.01)
(Continued)

(52) U.S. Cl.
CPC .............. *G06Q 10/087* (2013.01); *G06F 7/08* (2013.01); *G06F 16/215* (2019.01);
(Continued)

(58) Field of Classification Search
CPC . G06Q 10/087; G06F 16/215; G06F 18/2148; G06F 18/2413; G06F 18/2415;
(Continued)

(56) References Cited

U.S. PATENT DOCUMENTS 10,339,470 B1 *   7/2019   Dutta ..................... G06N 20/20
10,504,061 B1    12/2019   Shi
(Continued)

FOREIGN PATENT DOCUMENTS

| CN | 110597995 A | 12/2019 |
|---|---|---|
| JP | 2017-068848 | 4/2017 |

(Continued)

OTHER PUBLICATIONS

Further Examination Notice in Hong Kong Application No. 22021023330.4 dated May 9, 2023 (6 pages).
(Continued)

*Primary Examiner* — Casey R. Garner
(74) *Attorney, Agent, or Firm* — FINNEGAN, HENDERSON, FARABOW, GARRETT & DUNNER LLP

(57) ABSTRACT

Systems and methods are provided for categorizing products using AI. One method comprises retrieving initial training data including products associated with one or more categories; pre-processing the initial training data to generate synthesized training data; generating a hierarchical model using the synthesized training data, the hierarchical model containing at least two layers of nodes below a root node; receiving information associated with a first uncategorized product; and receiving a request to predict a set of N categories with the highest N total probability scores. The method may further comprise predicting, using the hierarchical model, N categories of the first uncategorized product, by calculating total probability scores, and determining the N categories with the highest N total probability scores; sorting the first uncategorized product into the N categories associated with the nodes from the first and second layers having the highest total probability scores; and displaying
(Continued)

the sorted first uncategorized product and its associated N categories on a user device associated with a user.

18 Claims, 11 Drawing Sheets

(51) Int. Cl.
　　　G06F 16/215　　(2019.01)
　　　G06F 18/214　　(2023.01)
　　　G06F 18/2413　(2023.01)
　　　G06F 18/2415　(2023.01)
　　　G06N 5/02　　　(2023.01)
　　　G06N 5/04　　　(2023.01)
　　　G06Q 10/087　　(2023.01)
　　　G06V 10/764　　(2022.01)
　　　G06V 10/774　　(2022.01)

(52) U.S. Cl.
　　　CPC ...... *G06F 18/2148* (2023.01); *G06F 18/2413* (2023.01); *G06F 18/2415* (2023.01); *G06N 5/02* (2013.01); *G06N 5/04* (2013.01); *G06N 20/00* (2019.01); *G06V 10/764* (2022.01); *G06V 10/774* (2022.01)

(58) Field of Classification Search
　　　CPC . G06F 7/08; G06N 20/00; G06N 5/02; G06N 5/04; G06V 10/774; G06V 10/764
　　　See application file for complete search history.

(56) References Cited

U.S. PATENT DOCUMENTS

| | | | | |
|---|---|---|---|---|
| 2003/0018652 | A1* | 1/2003 | Heckerman | G06Q 30/0641 |
| 2010/0306282 | A1* | 12/2010 | Bennett | G06N 5/02 |
| | | | | 707/954 |
| 2013/0159209 | A1 | 6/2013 | Zhao et al. | |
| 2016/0378770 | A1 | 12/2016 | Tholiya et al. | |
| 2018/0121533 | A1* | 5/2018 | Magnani | G06N 3/045 |
| 2018/0336226 | A1 | 11/2018 | Anorga et al. | |
| 2019/0236740 | A1 | 8/2019 | Rao et al. | |
| 2021/0150249 | A1* | 5/2021 | Zheng | G06N 3/08 |
| 2023/0067026 | A1* | 3/2023 | Huts | G06V 20/00 |

FOREIGN PATENT DOCUMENTS

| | | |
|---|---|---|
| JP | 2019-164402 | 9/2019 |
| JP | 2019164402 A | 9/2019 |
| KR | 10-2018-0137168 | 12/2018 |
| KR | 10-2019-0013276 | 2/2019 |
| KR | 10-2019-0121045 | 10/2019 |
| TW | I665566 B | 7/2019 |

OTHER PUBLICATIONS

Jason Wei et al., EDA: Easy Data Augmentation Techniques for Boosting Performance on Text Classification Tasks, Proceedings of the 2019 Conference on Empirical Methods in Natural Language Processing and the 9th International Joint Conference on Natural Language Processing, pp. 6382-6388, section 2-3, and 7, dated Aug. 25, 2019 (9 pages).

Office Action mailed May 27, 2021, by the Korean Patent Office in counterpart Korean Application No. 10-2020-0054711, 15 pages.

Notice of Allowance mailed Aug. 31, 2021, by the Taiwanese Patent Office in counterpart Taiwanese Application No. 109145276, 3 pages.

Examination Notice in counterpart Hong Kong Application No. 22021023330.4 dated Feb. 24, 2022 (8 pages).

\* cited by examiner

| Product ID | Category Level 1 | Category Level 2 | Category Level 3 | Category Level 4 | Category Level 5 | Category Level 6 | Product Name | Brand | Product Image URL |
|---|---|---|---|---|---|---|---|---|---|
| 38271434 | Fashion | Women's Fashion | Women's Clothing | Pants | Short Pants | (none) | Mark 4type Women's Short Pants BB Mark | Mark | (none) |
| ... | ... | ... | ... | ... | ... | ... | ... | ... | ... |

FIG. 4

COMPUTERIZED SYSTEMS AND METHODS FOR PRODUCT CATEGORIZATION USING ARTIFICIAL INTELLIGENCE

RELATED APPLICATIONS

This application is a continuation of U.S. patent application Ser. No. 16/793,536 (now allowed) filed on Feb. 18, 2020, which is hereby incorporated by reference in the present application in its entirety.

TECHNICAL FIELD

The present disclosure generally relates to computerized systems and methods for product categorization using artificial intelligence. In particular, embodiments of the present disclosure relate to inventive and unconventional systems relate to receiving training data associated with one or more categories, pre-processing the received training data, training one or more models for product categorization, and using information associated with uncategorized products received from sellers to predict and sort the uncategorized products into correct categories.

BACKGROUND

Consumers often shop for and purchase various items online through computers and smart devices. These online shoppers often rely on searching through categories of products to find products to purchase. However, the normal online shopping experience is hindered by incorrectly categorized products.

Millions of products are registered online by sellers every day. Sellers are required to select the correct category to which their product belongs when registering their products online for sale. However, many sellers do not select the correct category when registering their product. For example, a seller may incorrectly select the "Kid's Fashion" category when registering an infant onesie that belongs in the "Baby" category. Incorrect product categorization may severely reduce a consumer's user experience by prolonging the consumer's product search and by reducing the recommendation quality of the online platform. Furthermore, manually correcting the categorization of products is often difficult and time-consuming since over 17,000 different categories may exist. A consumer's user experience would be significantly improved if the online platform automatically categorized products into their correct categories.

Therefore, there is a need for improved methods and systems for product categorization so that consumers may quickly find and purchase products while online shopping.

SUMMARY

One aspect of the present disclosure is directed to a computer-implemented system for AI-based product categorization. The system may comprise at least one processor; and at least one non-transitory storage medium comprising instructions that, when executed by the at least one processor, cause the at least one processor to perform steps. The steps may comprise retrieving initial training data including products associated with one or more categories; pre-processing the initial training data to generate synthesized training data; generating a hierarchical model using the synthesized training data, the hierarchical model containing at least two layers of nodes below a root node; receiving information associated with a first uncategorized product; and receiving a request to predict a set of N categories with the highest N total probability scores. The steps may further comprise predicting, using the hierarchical model, N categories of the first uncategorized product, by calculating a probability score for each node on the first layer for the first uncategorized product, determining a set of n nodes on the first layer with the highest n probability scores, calculating a probability score for a set of nodes on the second layer, the set of nodes being below the determined set of n nodes with the highest n scores, determining a set of m nodes on the second layer with the highest m scores, calculating a total probability score based on the probability scores of the m nodes with the highest m scores and respective n nodes in the first layer, and determining the N categories with the highest N total probability scores; sorting the first uncategorized product into the N categories associated with the nodes from the first and second layers having the highest total probability scores; and displaying the sorted first uncategorized product and its associated N categories on a user device associated with a user.

Another aspect of the present disclosure is directed to a method for categorizing products using AI. The method may comprise retrieving initial training data including products associated with one or more categories; pre-processing the initial training data to generate synthesized training data; generating a hierarchical model using the synthesized training data, the hierarchical model containing at least two layers of nodes below a root node; receiving information associated with a first uncategorized product; and receiving a request to predict a set of N categories with the highest N total probability scores. The method may further comprise predicting, using the hierarchical model, N categories of the first uncategorized product, by calculating a probability score for each node on the first layer for the first uncategorized product, determining a set of n nodes on the first layer with the highest n probability scores, calculating a probability score for a set of nodes on the second layer, the set of nodes being below the determined set of n nodes with the highest n scores, determining a set of m nodes on the second layer with the highest m scores, calculating a total probability score based on the probability scores of the m nodes with the highest m scores and respective n nodes in the first layer, and determining the N categories with the highest N total probability scores; and sorting the first uncategorized product into the N categories associated with the nodes from the first and second layers having the highest total probability scores.

Yet another aspect of the present disclosure is directed to a computer-implemented system for AI-based product categorization. The system may comprise at least one processor; and at least one non-transitory storage medium comprising instructions that, when executed by the at least one processor, cause the at least one processor to perform steps. The steps may comprise retrieving initial training data including products and images associated with one or more categories; pre-processing the initial training data to generate synthesized training data; generating a hierarchical model using the synthesized training data, the hierarchical model containing at least two layers of nodes below a root node; generating an image model using the synthesized training data; receiving information associated with a first uncategorized product; and receiving a request to predict a set of N categories with the highest N total probability scores and a request to predict a set of M categories with the highest M total probability scores. The steps may further comprise predicting, using the hierarchical model, N categories of the first uncategorized product, by calculating a probability score for each node on the first layer for the first uncategorized product, determining a set of n nodes on the first layer with the highest n probability scores, calculating a probability score for a set of nodes on the second layer, the set of nodes being below the determined set of n nodes with the highest n scores, determining a set of m nodes on the second layer with the highest m scores, calculating a total probability score based on the probability scores of the m nodes with the highest m scores and respective n nodes in the first layer, and determining the N categories with the highest N total probability scores. The steps may further comprise predicting, using the image model, M categories of the first uncategorized product, by calculating a probability score for the first uncategorized product and determining the M categories with the highest M total probability scores. The steps may further comprise averaging the total probability score of the N categories with the M categories; sorting the first uncategorized product into the category of the N or M categories having the highest averaged total probability score; and displaying the sorted first uncategorized product and its associated N or M categories on a user device associated with a user.

Other systems, methods, and computer-readable media are also discussed herein.

BRIEF DESCRIPTION OF THE DRAWINGS

FIG. 4 depicts sample training data for product categorization, consistent with the disclosed embodiments.

DETAILED DESCRIPTION

Figure 1A:
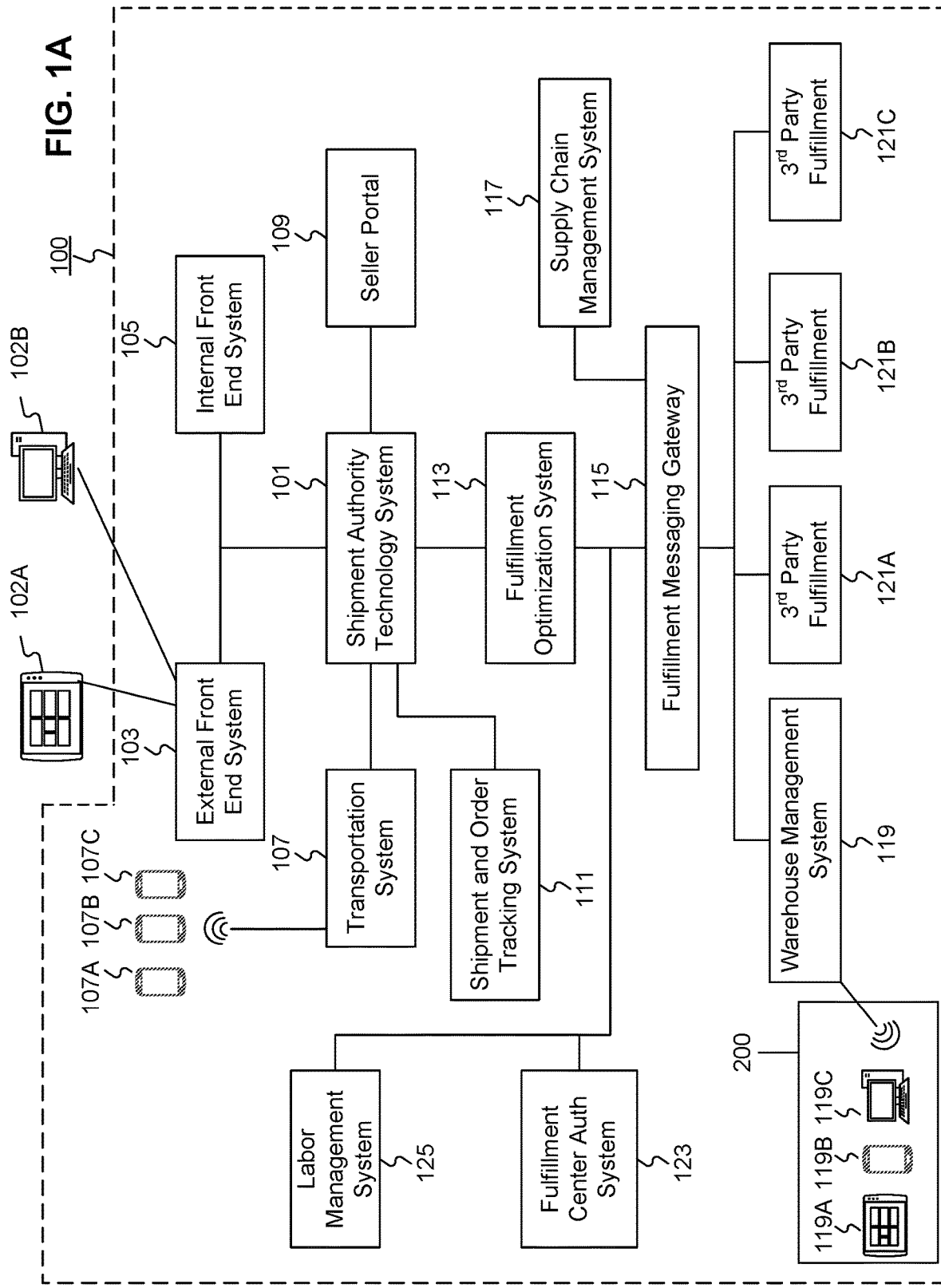
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for product categorization using artificial intelligence. The disclosed embodiments are advantageously capable of automatically generating training data for training a machine learning model ("model"), generating the model, and using the model to correctly categorize products of sellers. For example, a training data system may automatically generate initial training data including products associated with one or more categories. The initial training data may include automatically generated virtual product data, automatically generated mapping guideline keyword data, or automatic selection of live products. In some embodiments, the initial training data may include human labeled data provided by internal users (e.g., employees).

In one implementation, a pre-processing system may pre-process the initial training data received from training data system to generate synthesized training data. For example, text-based initial training data may be pre-processed using any combination of methods, including stop word elimination, keyword tokenization, deduplication of keywords, and augmentation of the initial training data, and image-based initial training data may be pre-processed using image augmentation techniques (e.g., PyTorch). A hierarchical model trainer system may receive the text-based synthesized training data generated by the pre-processing system and an image model trainer system may receive the image-based synthesized training data generated by the pre-processing system. The hierarchical model trainer system and the image model trainer may generate and train at least one hierarchical model and at least one image model, respectively, using the received synthesized data for product categorization.

In some embodiments, a product category predictor may receive information associated with a first uncategorized product. For example, a seller may be prompted to enter a concatenated text string including the product name, attribute values, manufacturer, brand, and model number when attempting to register a product. The product category predictor may receive a request to predict a number of categories with the highest total probability scores. The product category predictor may use the hierarchical model to predict the most relevant categories of the first uncategorized product by recursively calculating probability scores of potential categories and subcategories. The product category predictor may subsequently sort the uncategorized product into one or more of the categories having the highest total probability scores.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
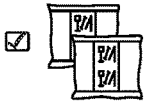
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
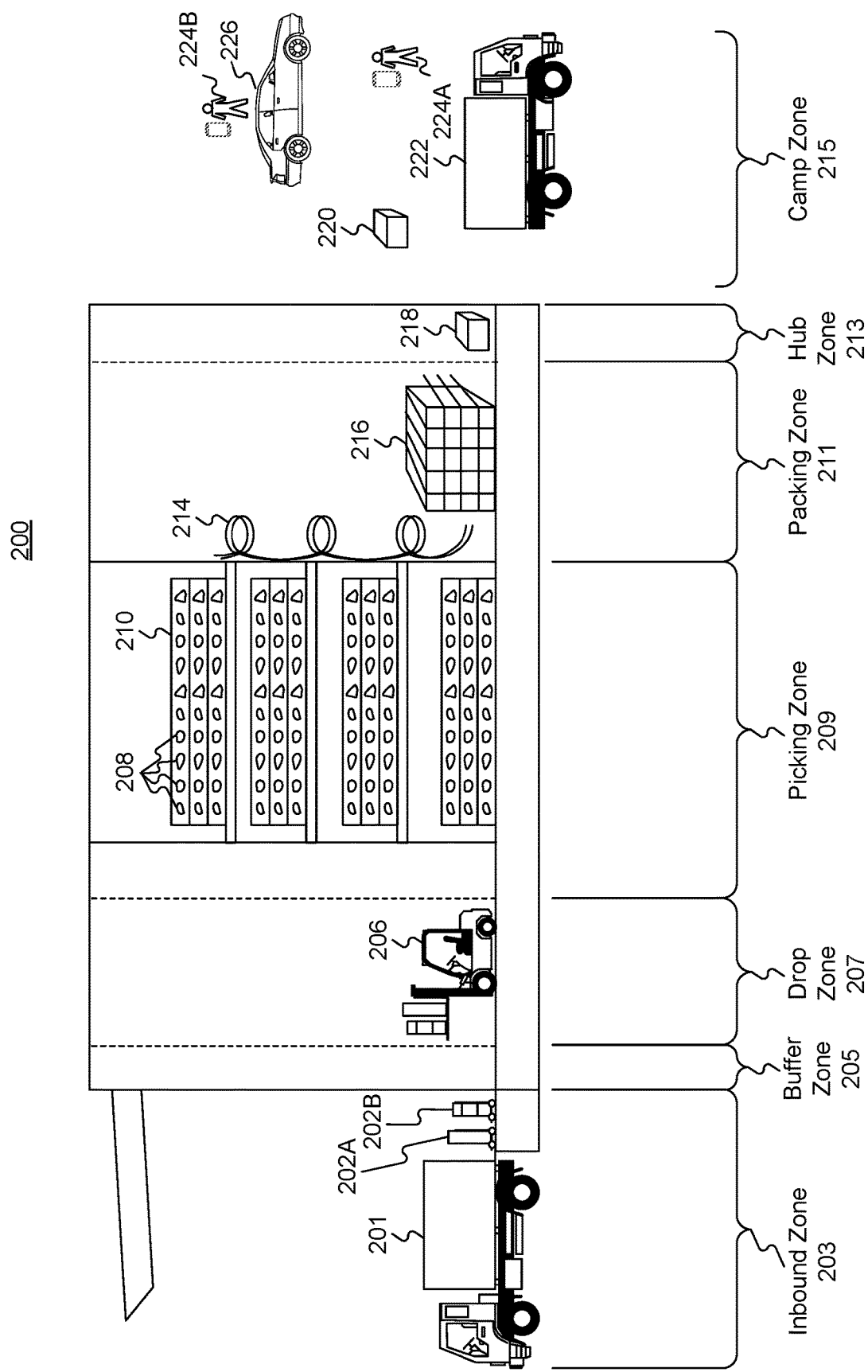
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
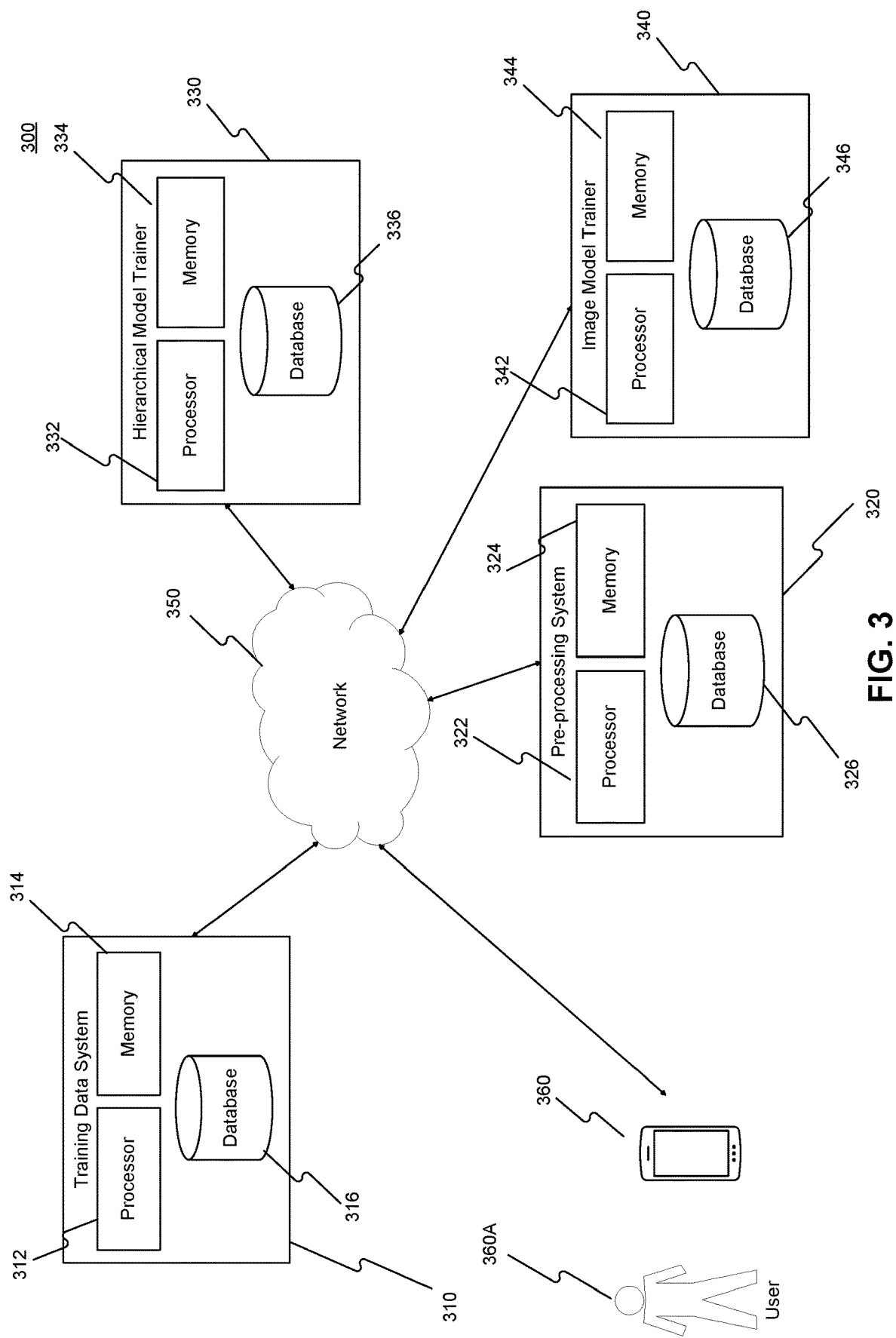
FIG. 3 is a schematic block diagram illustrating an exemplary embodiment of a network comprising computerized systems for training one or more models for product categorization, consistent with the disclosed embodiments.

Referring to FIG. 3, a schematic block diagram illustrating an exemplary embodiment of a network comprising computerized systems for training one or more models for product categorization is shown. As illustrated in FIG. 3, system 300 may include a training data system 310, a pre-processing system 320, a hierarchical model trainer system 330, and an image model trainer system 340, each of which may communicate with a user device 360 associated with a user 360A via a network 350. In some embodiments, training data system 310, pre-processing system 320, hierarchical model trainer system 330, and image model trainer system 340 may communicate with each other and with the other components of system 300 via a direct connection, for example, using a cable. In some other embodiments, system 300 may be a part of system 100 of FIG. 1A and may communicate with the other components of system 100 (e.g., external front end system 103 or internal front end system 105) via network 350 or via a direct connection, for example, using a cable. Training data system 310, pre-processing system 320, hierarchical model trainer system 330, and image model trainer system 340 may each comprise a single computer or may each be configured as a distributed computer system including multiple computers that interoperate to perform one or more of the processes and functionalities associated with the disclosed examples.

As shown in FIG. 3, training data system 310 may comprise a processor 312, a memory 314, and a database 316. Pre-processing system 320 may comprise a processor 322, a memory 324, and a database 326. Hierarchical model trainer system 330 may comprise a processor 332, a memory 334, and a database 336. Image model trainer system 340 may comprise a processor 342, a memory 344, and a database 346. Processors 312, 322, 332, and 342 may be one or more known processing devices, such as a microprocessor from the Pentium™ family manufactured by Intel™ or the Turion™ family manufactured by AMD™. Processors 312, 322, 332, and 342 may constitute a single core or multiple core processor that executes parallel processes simultaneously. For example, processors 312, 322, 332, and 342 may use logical processors to simultaneously execute and control multiple processes. Processors 312, 322, 332, and 342 may implement virtual machine technologies or other known technologies to provide the ability to execute, control, run, manipulate, store, etc. multiple software processes, applications, programs, etc. In another example, processors 312, 322, 332, and 342 may include a multiple-core processor arrangement configured to provide parallel processing functionalities to allow training data system 310, pre-processing system 320, hierarchical model trainer system 330, and image model trainer system 340 to execute multiple processes simultaneously. One of ordinary skill in the art would understand that other types of processor arrangements could be implemented that provide for the capabilities disclosed herein.

Memories 314, 324, 334, and 344 may store one or more operating systems that perform known operating system functions when executed by processors 312, 322, 332, and 342, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memories 314, 324, 334, and 344 may be a volatile or non-volatile, magnetic, semiconductor, tape, optical, removable, non-removable, or other type of storage device or tangible computer readable medium.

Databases 316, 326, 336, and 346 may include, for example, Oracle™ databases, Sybase™ databases, or other relational databases or non-relational databases, such as Hadoop™ sequence files, HBase™, or Cassandra™. Databases 316, 326, 336, and 346 may include computing components (e.g., database management system, database server, etc.) configured to receive and process requests for data stored in memory devices of the database(s) and to provide data from the database(s). Databases 316, 326, 336, and 346 may include NoSQL databases such as HBase, MongoDB™ or Cassandra™. Alternatively, databases 316, 326, 336, and 346 may include relational databases such as Oracle, MySQL and Microsoft SQL Server. In some embodiments, databases 316, 326, 336, and 346 may take the form of servers, general purpose computers, mainframe computers, or any combination of these components.

Databases 316, 326, 336, and 346 may store data that may be used by processors 312, 322, 332, and 342, respectively, for performing methods and processes associated with disclosed examples. Databases 316, 326, 336, and 346 may be located in training data system 310, pre-processing system 320, hierarchical model trainer system 330, and image model trainer system 340, respectively, as shown in FIG. 3, or alternatively, it may be in an external storage device located outside of training data system 310, pre-processing system 320, hierarchical model trainer system 330, and image model trainer system 340. Data stored in 316 may include any suitable initial training data associated with products (e.g., product identification number, highest category level, category sublevels, product name, product image, product brand, product description, etc.), data stored in 326 may include any suitable data associated with pre-processed training data, data stored in 336 may include any suitable data associated with training the hierarchical model, and data stored in 346 may include any suitable data associated with training the image model.

User device 360 may be a tablet, mobile device, computer, or the like. User device 360 may include a display. The display may include, for example, liquid crystal displays (LCD), light emitting diode screens (LED), organic light emitting diode screens (OLED), a touch screen, and other known display devices. The display may show various information to a user. For example, it may display an online platform for entering or generating training data, including an input text box for internal users (e.g., employees of an organization that owns, operates, or leases system 100) or external users to enter training data, including product information (e.g., product identification number, highest category level, category sublevels, product name, product image, product brand, product description, etc.). User device 360 may include one or more input/output (I/O) devices. The I/O devices may include one or more devices that allow user device 360 to send and receive information from user 360A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from training data system 310, pre-processing system 320, hierarchical model trainer system 330, or image model trainer system 340 by, for example, establishing wired or wireless connectivity between user device 360 and network 350.

Training data system 310 may receive initial training data including products associated with one or more categories. Training data system 310 may collect training data using a combination of different methods. Training data collection methods may include human labeled data, virtual product data, mapping guideline keyword data, or selection of live products. For example, training data system 310 may receive initial training data from internal users (e.g., employees of an organization that owns, operates, or leases system 100) via internal front end system 105.

Human labeled data may include user 360A manually inputting product information (e.g., product identification number, highest category level, category sublevels, product name, product image, product brand, product description, etc.) for each training data point for at least one training data point.

Virtual product data may include automatically generating augmented training data using existing categories. For example, training data system 310 may automatically generate at least one training data point including a product name (e.g., women's short pants) using keywords obtained from existing categories and subcategories (e.g., fashion, women's fashion, women's clothing, pants, short pants). Generating virtual product data may improve robustness of the model(s) to be trained since the product name is obvious from the keywords and should not be mis-categorized.

Mapping guideline keyword data may include automatically generating augmented training data using live products. For example, training data system 310 may automatically generate at least one training data point by searching database 316 for a live product that is mapped to at least one keyword. If the live product is already mapped to a product identification number and contains the at least one keyword in one of its associated category, training data system 310 considers that live product to be correctly categorized and generates a new training data point that is a duplicate of the live product. Generating mapping guideline keyword data may improve robustness of the model(s) to be trained since it increases the amount of correctly categorized training data to feed into the model(s) to be trained.

Selection of live products may include automatically generating augmented training data by randomly collecting a maximum of ten products from a live product list and their associated categories. For example, training data system 310 may determine that some categories do not have any associated training data. Training data system 310 may automatically generate training data by randomly collecting a maximum of ten live products that are labeled with the categories that do not have any associated training data, and generate new training data points that are duplicates of the collected live products. Selection of live products may improve the quality of the model(s) to be trained by providing a more complete training data set.

Pre-processing system 320 may receive the initial training data collected by training data system 310 and generate synthesized training data by pre-processing the initial training data. The text-based initial training data may be pre-processed using any combination of methods, which include stop word elimination, keyword tokenization, deduplication of keywords, and augmentation of the initial training data, and the image-based initial training data may be pre-processed using image augmentation techniques (e.g., PyTorch).

Pre-processing system 320 may eliminate stop words by referencing a dictionary of stop words stored in database 326. Stop words may include words associated with the training data that are not relevant to product characteristics and, thus, are not necessary for product categorization. For example, stop words may include "sale," "discount," or "free delivery." Stop word elimination may increase robustness of the model(s) to be trained by removing superfluous words that slow down the model training process from the training data set.

Pre-processing system 320 may tokenize keywords by referencing a token dictionary stored in database 326 and implementing an Aho-Corasick algorithm to determine whether or not to split a keyword into multiple keywords.

For example, keywords written in certain languages (such as Korean) may be stored as a single string of text without spaces. (A fluent speaker would understand that this string of text may be split into various combinations of words.) Pre-processing system 320 may implement an Aho-Corasick algorithm, which is a dictionary-matching algorithm that locates elements of a finite set of strings (e.g., the "dictionary") within an input text. The algorithm matches all the strings simultaneously so that pre-processing system 320 may generate synthesized training data by collecting the actual keywords of the input text while removing "split" words that are not listed in the stored dictionary. Keyword tokenization may increase robustness of the model(s) to be trained by removing superfluous words that slow down the model training process from the training data set.

Pre-processing system 320 may deduplicate keywords by identifying keywords in the training set and removing any duplicates of the existing keywords. Keyword deduplication may increase the balance of product categorization results by removing repeating keywords.

Pre-processing system 320 may augment the initial training data by duplicating some training data and either removing irrelevant alphanumeric characters from the duplicated data or randomly removing keywords from the duplicated data. For example, when the training data and product categories are mostly written in Korean, pre-processing system 320 may duplicate the initial training data and remove English and numerical characters from the duplicated training data. Pre-processing system 320 may then add this augmented data to the training data set to enforce increased model learning of Korean characters. Pre-processing system 320 may also duplicate the initial training data and randomly remove keywords from the duplicated training data. Pre-processing system 320 may then add this augmented data to the training data set to increase robustness of the model(s) to be trained by reducing the likelihood of overfitting the model(s).

Pre-processing system 320 may augment the image-based initial training data by rotating the images, shifting the images, flipping the images, adding noise to the images, blurring the images, etc. For example, pre-processing system 320 may duplicate each image of the initial training data set multiple times and rotate the duplicated images in various orientations. Pre-processing system 320 may increase the robustness of the model(s) to be trained by adding the rotated duplicated images to the training data set.

In another example, pre-processing system 320 may duplicate each image of the initial training data set multiple times and shift the duplicated images in various off-center positions. Pre-processing system 320 may increase the robustness and generalization of the model(s) to be trained by adding the shifted duplicated images to the training data set.

In another example, pre-processing system 320 may duplicate each image of the initial training data set multiple times and flip the duplicated images in various orientations. Pre-processing system 320 may increase the generalization of the model(s) to be trained by adding the flipped duplicated images to the training data set.

In another example, pre-processing system 320 may duplicate each image of the initial training data set multiple times and add random noise to the duplicated images. Pre-processing system 320 may help the model(s) learn to separate signal from noise in an image by adding the duplicated images with noise to the training data set, thereby increasing the robustness of the model(s) to be trained.

In another example, pre-processing system 320 may duplicate each image of the initial training data set multiple times and blur (e.g., change the quality of) the duplicated images in various amounts. Pre-processing system 320 may increase the robustness of the model(s) to be trained by adding the blurred duplicated images to the training data set.

Hierarchical model trainer system 330 may receive the text-based synthesized training data generated by pre-processing system 320 and image model trainer system 340 may receive the image-based synthesized training data generated by pre-processing system 320. Hierarchical model trainer system 330 and image model trainer 340 may generate and train at least one hierarchical model and at least one image model, respectively, using the received synthesized data for product categorization.

Referring to FIG. 4, sample training data 400 for product categorization is shown. As illustrated in FIG. 4, training data may include multiple cells that are associated with a single product. For example, training data may include a product identification number 410, a high level category 412, one or more subcategories 414, a product name 416, a brand 418, or a product image URL 420. Training data may be obtained using any of the embodiments disclosed herein.

Figure 5:
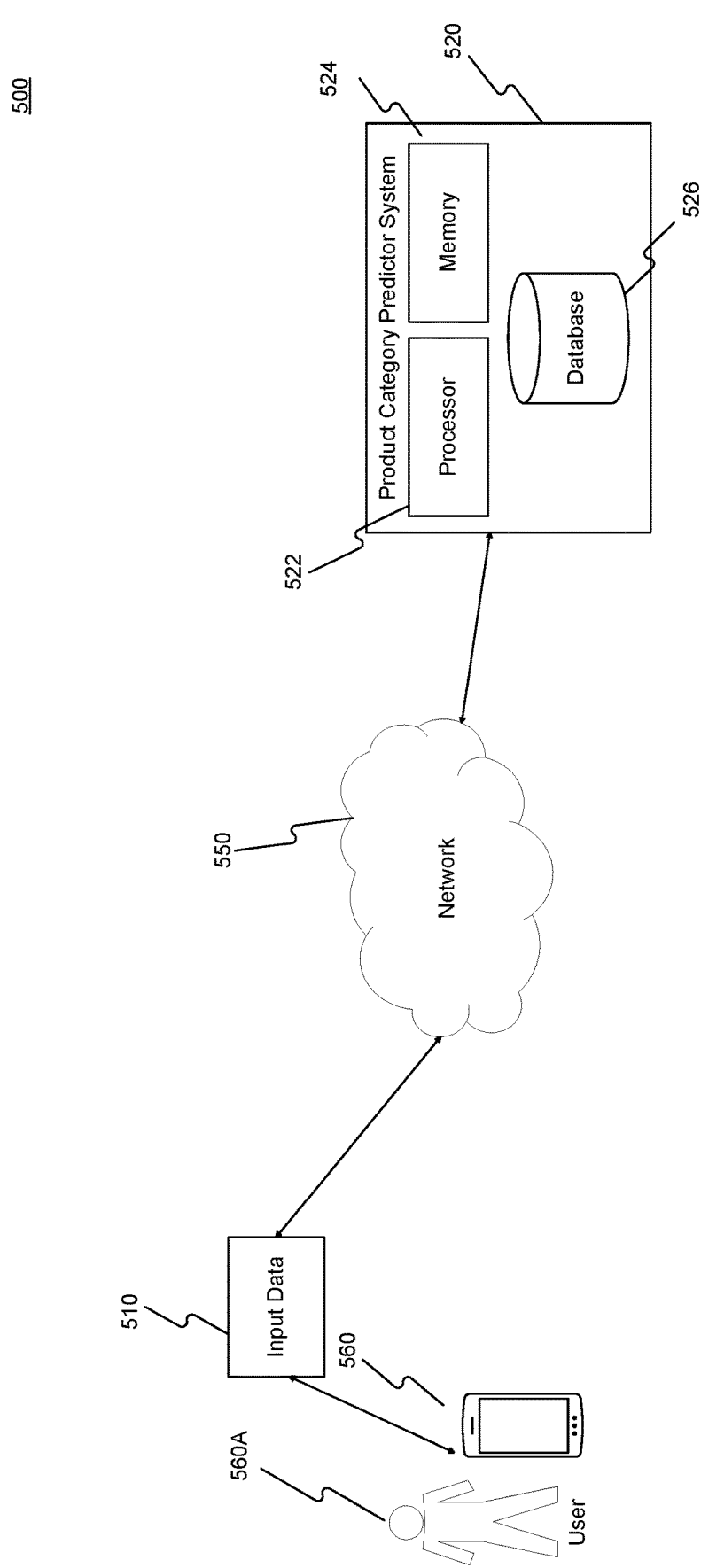
FIG. 5 is a schematic block diagram illustrating an exemplary embodiment of a network comprising computerized systems for product categorization using one or more models, consistent with the disclosed embodiments.

Referring to FIG. 5, a schematic block diagram illustrating an exemplary embodiment of a network comprising computerized systems for product categorization using one or more models is shown. As illustrated in FIG. 5, system 500 may include a product category predictor system 520, which may communicate with a user device 560 (which may be the same as user device 360 of FIG. 3) associated with a user 560A (which may be the same user 360A of FIG. 3) via a network 550. In some embodiments, product category predictor 520 may communicate with the other components of system 500 via a direct connection, for example, using a cable. In some other embodiments, system 500 may be a part of system 100 of FIG. 1A or system 300 of FIG. 3 and may communicate with the other components of systems 100 or 300 via network 550 or via a direct connection, for example, using a cable. Product category predictor 520 may comprise a single computer or may be configured as a distributed computer system including multiple computers that interoperate to perform one or more of the processes and functionalities associated with the disclosed examples.

As shown in FIG. 5, product category predictor 520 may comprise a processor 522, a memory 524, and a database 526. Processor 522 may be one or more known processing devices, such as a microprocessor from the Pentium™ family manufactured by Intel™ or the Turion™ family manufactured by AMD™. Processor 522 may constitute a single core or multiple core processor that executes parallel processes simultaneously. For example, processor 522 may use logical processors to simultaneously execute and control multiple processes. Processor 522 may implement virtual machine technologies or other known technologies to provide the ability to execute, control, run, manipulate, store, etc. multiple software processes, applications, programs, etc. In another example, processor 522 may include a multiple-core processor arrangement configured to provide parallel processing functionalities to allow product category predictor 520 to execute multiple processes simultaneously. One of ordinary skill in the art would understand that other types of processor arrangements could be implemented that provide for the capabilities disclosed herein.

Memory 524 may store one or more operating systems that perform known operating system functions when executed by processor 522, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memory 524 may be a volatile or non-volatile, magnetic, semiconductor, tape, optical, removable, non-removable, or other type of storage device or tangible computer readable medium.

Database 526 may include, for example, Oracle™ databases, Sybase™ databases, or other relational databases or non-relational databases, such as Hadoop™ sequence files, HBase™, or Cassandra™. Database 526 may include computing components (e.g., database management system, database server, etc.) configured to receive and process requests for data stored in memory devices of the database(s) and to provide data from the database(s). Database 526 may include NoSQL databases such as HBase, MongoDB™ or Cassandra™. Alternatively, database 526 may include relational databases such as Oracle, MySQL and Microsoft SQL Server. In some embodiments, database 526 may take the form of servers, general purpose computers, mainframe computers, or any combination of these components.

Database 526 may store data that may be used by processor 522 for performing methods and processes associated with disclosed examples. Database 526 may be located in product category predictor 520 as shown in FIG. 5, or alternatively, it may be in an external storage device located outside of product category predictor 520. Data stored in 526 may include any information associated with products provided by sellers (e.g., product name, attribute values, manufacturer, brand, model number, etc.).

User device 560 may be a tablet, mobile device, computer, or the like. User device 560 may include a display. The display may include, for example, liquid crystal displays (LCD), light emitting diode screens (LED), organic light emitting diode screens (OLED), a touch screen, and other known display devices. The display may show various information to a user. For example, it may display an online platform for entering product information, including an input text box for sellers to enter product information (e.g., product name, attribute values, manufacturer, brand, model number, etc.). User device 560 may include one or more input/output (I/O) devices. The I/O devices may include one or more devices that allow user device 560 to send and receive information from user 560A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from product category predictor 520 by, for example, establishing wired or wireless connectivity between user device 560 and network 550.

Product category predictor 520 may receive input data 510 from user 560A (e.g., seller(s)) via network 550. For example, user 560A may use user device 560 to communicate with seller portal 109 and register at least one product. User 560A may be prompted to enter a concatenated text string including the product name, attribute values, manufacturer, brand, and model number. User 560A may also be prompted to enter a number of categories N and a number of categories M that product category predictor 520 may predict for a given product. The input 510 including the concatenated text string and the numbers of categories N and M may be the only input data.

Product category predictor 520 may identify the keywords from input 510 and use a library (e.g., fastText) to transform the keywords into vector representations. Product category predictor 520 may use the library to learn a representation for each keyword's character n-gram. Each keyword may then be represented as a bag of character n-grams and the overall word embedding is a sum of the character n-grams. For example, an internal user or external user (e.g., user 560A) may manually set or product category predictor 520 may automatically set the n-gram to 3, in which case the vector for the word "where" would be represented by a sum of trigrams: <wh, whe, her, ere, re>, where the brackets <, > are boundary symbols that denote the beginning and end of a word. After each word is represented as a sum of n-grams, a latent text embedding is derived as an average of the word embedding, at which point the text embedding may be used by product category predictor 520 to predict the label. This process may be advantageous in identifying rare keywords or keywords that were not included in the training data set.

Product category predictor 520 may use a trained hierarchical model (e.g., hierarchical model trainer system 330 of FIG. 3) to predict categories associated with product information provided by user 560A. In some embodiments, the product information may indicate that the product is incorrectly categorized, in which case product category predictor 520 may predict the correct categories for that product. The hierarchical model may use input 510 to predict N categories of the uncategorized product by first calculating a probability score for each node on the first layer for the uncategorized product. The probability score indicates the probability that the uncategorized product belongs to the associated category. The hierarchical model may then determine a set of n nodes on the first layer (e.g., layer 610 of FIG. 6) with the highest n probability scores. For example, the top layer may include five categories and, where n=3, the hierarchical model may determine the three nodes (or categories) on the first layer with the three highest probability score.

The hierarchical model may then calculate a probability score for a set of nodes on the second layer (e.g., second layer 620 of FIG. 6), where the set of nodes on the second layer are subcategories of the n nodes (or categories) with the highest n probability scores. The hierarchical model may then determine a set of m nodes on the second layer with the highest m scores. For example, where m=3, the hierarchical model may determine the three nodes (or categories) on the second layer with the three highest scores. The hierarchical model may continue this process recursively for any number of categories. If a node in the final layer (e.g., layer 630 of FIG. 6) has more nodes beyond the final layer, the hierarchical model may flatten the structure of that node so that a final, total probability score may be calculated.

The hierarchical model may calculate a total probability based on the probability scores of the nodes in each layer. For example, if the hierarchical model has three layers based on the highest three probability scores of each previous layer, then hierarchical model has 27 final category candidates in the third layer to choose from (layer 1's top 3·layer 2's top 3·layer 3's top 3=27 candidates). The total probability score for each of the 27 candidates (e.g., node 631 of FIG. 6) may be calculated by multiplying its probability score in each layer (e.g., layer 1 score·layer 2 score·layer 3 score=total probability score for one node). The hierarchical model may then determine the N categories with the highest N total probability scores.

Product category predictor 520 may use a trained image model (e.g., image model trainer 340 of FIG. 3) to predict M categories of a first uncategorized product. Product category predictor 520 may calculate a probability score for each category using the trained image model and determine the highest M categories with the highest M probability scores.

Product category predictor 520 may average the total probability score of the N categories with the total probability score of the corresponding M categories. For example, for a particular category, the total probability score determined by the hierarchical model for that category is averaged with the total probability score determined by the image model for that same category. N and M may not necessarily be the same number of categories. For example, if the hierarchical model determines a score for one of the N categories and the image model does not have a score for that same category, the total probability score from the image model for that category is zero. Product category predictor 520 may determine that the categories with the highest average scores are the most relevant categories for the uncategorized product, and subsequently sort the uncategorized product into the one or more of the N or M categories having the highest averaged total probability score.

Figure 6:
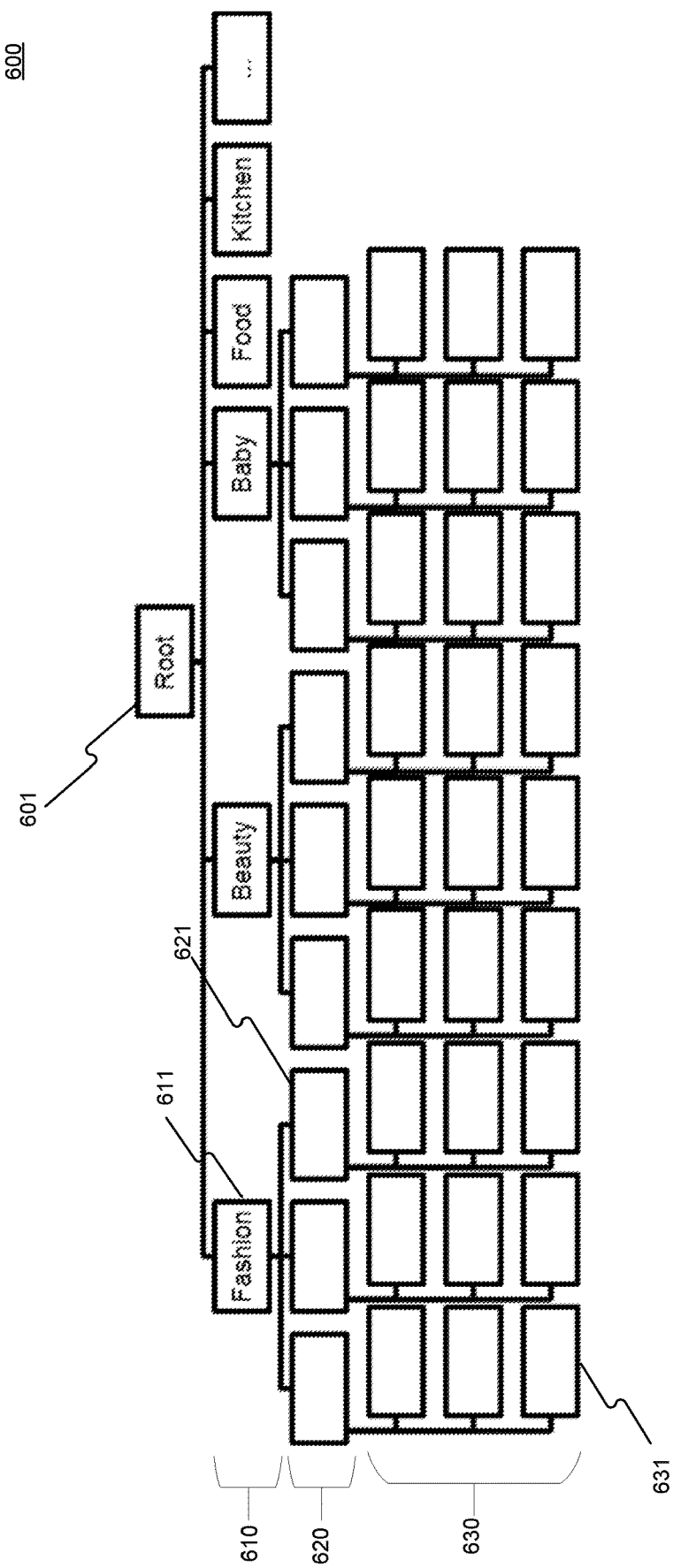
FIG. 6 depicts a sample hierarchical model for product categorization, consistent with the disclosed embodiments.

Referring to FIG. 6, a sample hierarchical model 600 for product categorization is shown. For example, hierarchical model 600 may include a root node 601 and a first layer 610, which includes a plurality of nodes 611 representing different product categories. Hierarchical model 600 may also include a second layer 620, which includes a plurality of nodes 621 representing different product subcategories of nodes 611. Hierarchical model 600 may also include a third layer 630, which includes a plurality of nodes 631 representing different product subcategories of nodes 621. Hierarchical model 600 may include any number of layers and nodes and is not limited to the embodiment depicted.

Figure 7:
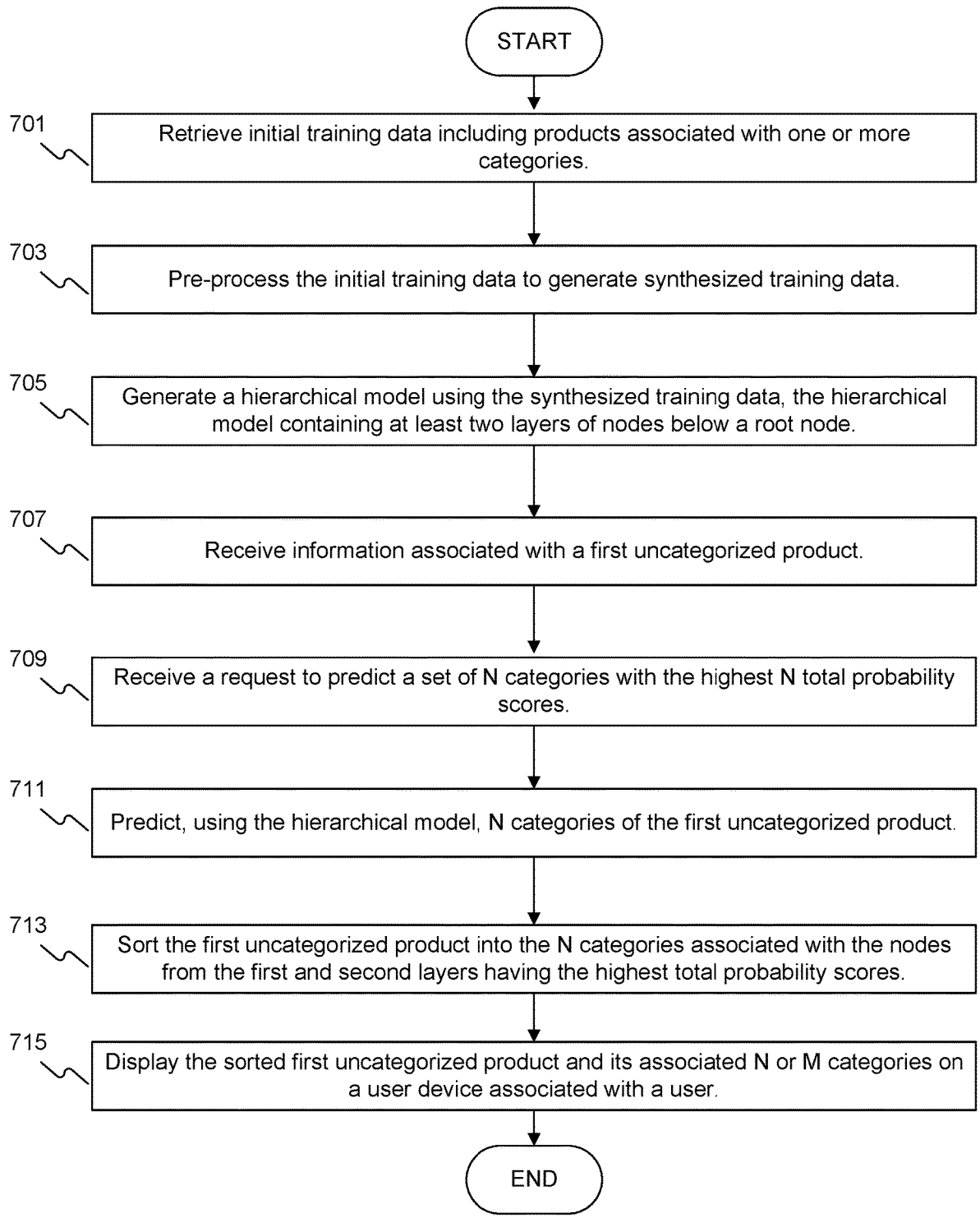
FIG. 7 depicts a process for product categorization, consistent with the disclosed embodiments.

Referring to FIG. 7, a process for product categorization is shown. While in some embodiments one or more of the systems depicted in FIGS. 3 and 5 may perform several of the steps described herein, other implementations are possible. For example, any of the systems and components (e.g., system 100, etc.) described and illustrated herein may perform the steps described in this disclosure.

In step 701, training data system 310 may receive, from user 360A over network 350, initial training data (e.g., product identification 410, high level category 412, subcategories 414, product name 416, brand 418, or product image URL 420 of FIG. 4) including products associated with one or more categories. For example, initial training data may include any combination of human labeled data, automatically generated virtual product data, automatically generated mapping guideline keyword data, or automatic selection of live products. Training data system 310 may receive initial training data from internal users (e.g., employees of an organization that owns, operates, or leases system 100) via internal front end system 105.

In step 703, pre-processing system 320 may pre-process the initial training data received from training data system 310 to generate synthesized training data. For example, text-based initial training data may be pre-processed using any combination of methods, which include stop word elimination, keyword tokenization, deduplication of keywords, and augmentation of the initial training data, and the image-based initial training data may be pre-processed using image augmentation techniques (e.g., PyTorch).

In step 705, hierarchical model trainer system 330 may receive the text-based synthesized training data generated by pre-processing system 320 and image model trainer system 340 may receive the image-based synthesized training data generated by pre-processing system 320. Hierarchical model trainer system 330 and image model trainer 340 may generate and train at least one hierarchical model and at least one image model, respectively, using the received synthesized data for product categorization. Going back to exemplary FIG. 6, the hierarchical model may contain at least two layers, 610 and 620, of nodes, 611 and 621, below root node 601.

In step 707, product category predictor 520 may receive information associated with a first uncategorized product. For example, user 560A may use user device 560 to communicate with seller portal 109 and register at least one product. User 560A may be prompted to enter a concatenated text string including the product name, attribute values, manufacturer, brand, and model number.

In step 709, product category predictor 520 may receive a request to predict a set of N categories with the highest N total probability scores. For example, user 560A may be prompted to enter a number of categories N that product category predictor 520 may predict for a given product.

In step 711, product category predictor 520 may use the hierarchical model to predict N categories of the first uncategorized product by first calculating a probability score for each node on the first layer for the uncategorized product. The probability score indicates the probability that the uncategorized product belongs to the associated category. The hierarchical model may then determine a set of n nodes on the first layer (e.g., layer 610 of FIG. 6) with the highest n probability scores. For example, the top layer may include five categories and, where n=3, the hierarchical model may determine the three nodes (or categories) on the first layer with the three highest probability score. The hierarchical model may then calculate a probability score for a set of nodes on the second layer (e.g., second layer 620 of FIG. 6), where the set of nodes on the second layer are subcategories of the n nodes (or categories) with the highest n probability scores. The hierarchical model may then determine a set of m nodes on the second layer with the highest m scores. For example, where m=3, the hierarchical model may determine the three nodes (or categories) on the second layer with the three highest scores. The hierarchical model may continue this process recursively for any number of categories. The hierarchical model may calculate a total probability based on the probability scores of the m nodes with the highest m scores and respective n nodes in the first layer. The hierarchical model may then determine the N categories with the highest N total probability scores.

In step 713, product category predictor 520 may subsequently sort the uncategorized product into the one or more of the N categories associated with the nodes from the first and second layers having the highest total probability scores.

In step 715, product category predictor 520 may display the sorted first uncategorized product and its associated N categories on a user device (e.g., user device 560) associated with a user (e.g., user 560A). For example, product category predictor 520 may prepare or modify a web page to include data associated with the first uncategorized product and one or more associated categories.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for AI-based product categorization, the system comprising:
    a memory storing instructions; and
    at least one processor configured to execute the instructions to:
        retrieve training data including products associated with one or more categories;
        pre-process the training data to generate synthesized training data, wherein pre-processing the training data comprises duplicating the training data and at least one of randomly removing keywords from the duplicated training data and adding random noise to the duplicated training data;
        generate a hierarchical model and an image model using the synthesized training data, the hierarchical model containing at least two layers of nodes below a root node;
        predict, using the hierarchical model, N categories of a first uncategorized product, by:
            calculating a probability score for each node on a first layer of the hierarchical model for the first uncategorized product,
            calculating a probability score for a set of nodes on a second layer of the hierarchical model,
            calculating a total probability score based on probability scores of a set of nodes with highest scores on the second layer and nodes in the first layer that are respective to the set of nodes on the second layer, and
            determining N categories with the highest N total probability scores;
        predict, using the image model, M categories of the first uncategorized product;
        sort the first uncategorized product into the N or M categories having the highest total probability scores; and
        display the sorted first uncategorized product and its associated N or M categories on a user device.

2. The system of claim 1, wherein the training data includes images associated with one or more categories.

3. The system of claim 2, wherein pre-processing the training data further comprises at least one of rotating the images, shifting the images, flipping the images, adding noise to the images, or blurring the images.

4. The system of claim 2, wherein pre-processing the training data further comprises duplicating the images and shifting the duplicated images in different positions.

5. The system of claim 2, wherein pre-processing the training data further comprises duplicating the images and flipping the duplicated images in different orientations.

6. The system of claim 2, wherein pre-processing the training data further comprises duplicating the images and adding noise to the duplicated images.

7. The system of claim 2, wherein pre-processing the training data further comprises duplicating the images and blurring the duplicated images.

8. The system of claim 1, wherein the training data comprises at least one of human labeled data, virtual product data, mapping guideline keyword data, or selection of live products.

9. The system of claim 8, wherein the instructions further cause the processor to generate the virtual product data using existing categories.

10. A method categorizing products using AI-based product categorization, the method comprising:
    retrieving training data including products associated with one or more categories;
    pre-processing the training data to generate synthesized training data, wherein pre-processing the training data comprises duplicating the training data and at least one of randomly removing keywords from the duplicated training data and adding random noise to the duplicated training data;
    generating a hierarchical model and an image model using the synthesized training data, the hierarchical model containing at least two layers of nodes below a root node;
    predicting, using the hierarchical model, N categories of a first uncategorized product, by:
        calculating a probability score for each node on a first layer of the hierarchical model for the first uncategorized product,
        calculating a probability score for a set of nodes on a second layer of the hierarchical model,
        calculating a total probability score based on probability scores of a set of nodes with highest scores on the second layer and nodes in the first layer that are respective to the set of nodes on the second layer, and
        determining N categories with the highest N total probability scores;
    predicting, using the image model, M categories of the first uncategorized product;
    sorting the first uncategorized product into the N or M categories having the highest total probability scores; and
    displaying the sorted first uncategorized product and its associated N or M categories on a user device.

11. The method of claim 10, wherein the training data includes images associated with one or more categories.

12. The method of claim 10, wherein pre-processing the training data further comprises at least one of rotating the images, shifting the images, flipping the images, adding noise to the images, or blurring the images.

13. The method of claim 10, wherein pre-processing the training data further comprises duplicating the images and shifting the duplicated images in different positions.

14. The method of claim 10, wherein pre-processing the training data further comprises duplicating the images and flipping the duplicated images in different orientations.

15. The method of claim 10, wherein pre-processing the training data further comprises duplicating the images and adding noise to the duplicated images.

16. The method of claim 10, wherein pre-processing the training data further comprises duplicating the images and blurring the duplicated images.

17. The method of claim 10, wherein the training data comprises at least one of human labeled data, virtual product data, mapping guideline keyword data, or selection of live products.

18. The method of claim 17, further comprising generating the virtual product data using existing categories.

* * * * *